(12) United States Patent
Iihoshi et al.

(10) Patent No.: US 11,242,813 B2
(45) Date of Patent: Feb. 8, 2022

(54) INTERNAL COMBUSTION ENGINE CONTROL DEVICE

(71) Applicant: Hitachi Automotive Systems, Ltd., Hitachinaka (JP)

(72) Inventors: Yoichi Iihoshi, Tokyo (JP); Toshio Hori, Hitachinaka (JP); Takafumi Arakawa, Tokyo (JP); Haoyun Shi, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 106 days.

(21) Appl. No.: 16/629,596

(22) PCT Filed: Jul. 5, 2018

(86) PCT No.: PCT/JP2018/025464
§ 371 (c)(1),
(2) Date: Jan. 9, 2020

(87) PCT Pub. No.: WO2019/039107
PCT Pub. Date: Feb. 28, 2019

(65) Prior Publication Data
US 2021/0087992 A1 Mar. 25, 2021

(30) Foreign Application Priority Data

Aug. 24, 2017 (JP) .............................. JP2017-160736

(51) Int. Cl.
*F02D 41/18* (2006.01)
*F02D 41/00* (2006.01)
(Continued)

(52) U.S. Cl.
CPC ......... *F02D 41/18* (2013.01); *F02D 41/0002* (2013.01); *F02D 41/123* (2013.01);
(Continued)

(58) Field of Classification Search
CPC .... F02D 41/18; F02D 41/0002; F02D 41/123; F02D 2009/0281; F02D 2009/0284;
(Continued)

(56) References Cited

U.S. PATENT DOCUMENTS 6,098,602 A * 8/2000 Martin ................ F02D 41/0072
123/568.23
10,890,126 B2 * 1/2021 Hamamoto ......... F02D 41/0072
(Continued)

FOREIGN PATENT DOCUMENTS

JP 9-170966 A 6/1997
JP 2000-310143 A 11/2000
(Continued)

OTHER PUBLICATIONS

International Search Report (PCT/ISA/210) issued in PCT Application No. PCT/JP2018/025464 dated Oct. 23, 2018 with English translation (four (4) pages).
(Continued)

*Primary Examiner* — Joseph J Dallo
*Assistant Examiner* — Kurt Philip Liethen
(74) *Attorney, Agent, or Firm* — Crowell & Moring LLP (57) ABSTRACT

Transmission shocks and idling defects such as engine racing and rough idling due to aging of a throttle opening area are prevented from occurring. An internal combustion engine control apparatus for controlling an internal combustion engine that has an air flow rate sensor for measuring a rate of air represented as an actual air rate, the air flowing into a cylinder, and a throttle valve for adjusting the rate of air, includes a throttle valve controlling section for controlling a throttle opening of the throttle valve to reach a preset throttle opening set depending on a target air rate for realizing a demand torque, and a throttle opening correcting section for correcting the preset throttle opening on the basis
(Continued)

of the target air rate upon fuel cutoff that stops a fuel from being supplied to the internal combustion engine and of an actual air rate measured by the air flow rate sensor.

9 Claims, 11 Drawing Sheets

(51) Int. Cl.
*F02D 41/12* (2006.01)
*F02D 9/02* (2006.01)
(52) U.S. Cl.
CPC ............... *F02D 2009/0281* (2013.01); *F02D 2009/0284* (2013.01); *F02D 2250/18* (2013.01)
(58) Field of Classification Search
CPC .. F02D 2250/18; F02D 41/08; F02D 41/2464; F02D 11/105; F02D 41/221; F02D 9/02; Y02T 10/40
See application file for complete search history.

(56) References Cited

U.S. PATENT DOCUMENTS

| | | | |
|---|---|---|---|
| 2004/0024517 A1* | 2/2004 | Jankovic | F02D 41/0002 701/102 |
| 2006/0185655 A1* | 8/2006 | Mitsutani | F02D 41/1482 123/674 |
| 2008/0066718 A1* | 3/2008 | Sato | F02D 9/02 123/350 |
| 2008/0097681 A1 | 4/2008 | Nakano et al. | |
| 2014/0121947 A1* | 5/2014 | Komuro | F02N 11/0829 701/103 |
| 2017/0051662 A1* | 2/2017 | Hagari | F02D 41/2432 |
| 2018/0045130 A1* | 2/2018 | Kuroda | F02D 37/02 |
| 2018/0363576 A1* | 12/2018 | Nakamura | F02D 41/123 |

FOREIGN PATENT DOCUMENTS

| | | |
|---|---|---|
| JP | 2006-138236 A | 6/2006 |
| JP | 2006-138270 A | 6/2006 |
| JP | 2007-187064 A | 7/2007 |
| JP | 2008-101578 A | 5/2008 |
| JP | 2010-19186 A | 1/2010 |
| JP | 2013-2386 A | 1/2013 |
| JP | 2014-190173 A | 10/2014 |
| JP | 2016-217176 A | 12/2016 |
| JP | 2017-14985 A | 1/2017 |
| WO | WO 2006/016423 A1 | 2/2006 |

OTHER PUBLICATIONS

Japanese-language Written Opinion (PCT/ISA/237) issued in PCT Application No. PCT/JP2018/025464 dated Oct. 23, 2018 (five (5) pages).

* cited by examiner

INTERNAL COMBUSTION ENGINE CONTROL DEVICE

TECHNICAL FIELD

The present invention relates to an internal combustion engine control apparatus for controlling an internal combustion engine that includes a throttle valve for adjusting a rate of air flowing into a cylinder of the internal combustion engine.

BACKGROUND ART

As $CO_2$ regulation intensifies, low fuel consumption technologies such as idling stop, mass EGR, and the like have been introduced, and model base controls have been put to practical use for the efficient development of such complex control processes. Especially, the throttle valve of an internal combustion engine functions as a key device for adjusting the rate of air flowing into cylinders to control the shaft torque of the internal combustion engine. There have been introduced model base controls based on the model of a throttle opening and an opening area, i.e., a throttle opening model.

One problem of the model base controls is a model error. The model error is caused by factors including machine difference and aging. The throttle opening model referred to above, in particular, suffers the problem of deposits adhering in the vicinity of a throttle flow passage. In recent years, furthermore, because LP-EGR engines that introduce EGR upstream of a supercharger to meet fuel cost requirements have started to appear on the market, the model error due to the adhesion and removal of deposits tends to be larger than heretofore.

Processes for learning a throttle opening model error on account of deposits include, for example, a process for learning in an idling region a valve opening and a loss, i.e., a deviation between an opening and a flow rate model, as disclosed in Patent Document 1, and a process of learning in all regions an opening—opening area model, as disclosed in Patent Document 2.

PRIOR ART DOCUMENT

Patent Documents

Patent Document 1: JP-2006-138270-A
Patent Document 2: JP-2016-217176-A

SUMMARY OF THE INVENTION

Problems to be Solved by the Invention

However, according to the process disclosed in Patent Document 1, the learning region is limited to idling of the engine while the engine is cooling down or warming up. Therefore, the disclosed process may fail to achieve sufficient accuracy with respect to idling-stop vehicles that have recently been on the increase as they reduce learning opportunities. Furthermore, the process disclosed in Patent Document 2 is problematic as to opening learning particularly in case the throttle opening is large. For example, in the vicinity of a full throttle opening, pressure pulsations that occur in an intake pipe may cause the air flow rate to be detected as larger than an actual value, tending to result in a throttle opening area learned in error.

The present invention is addressed to solving the above problems. It is an object of the present invention to provide an internal combustion engine control apparatus for detecting the adhesion and removal of deposits and quickly correcting a throttle opening.

Means for Solving the Problems

In order to solve the above problems, there is provided in accordance with the present embodiment an internal combustion engine control apparatus for controlling an internal combustion engine that has an air flow rate sensor for measuring a rate of air represented as an actual air rate, the air flowing into a cylinder, and a throttle valve for adjusting the rate of air, including a throttle valve controlling section for controlling a throttle opening of the throttle valve to reach a preset throttle opening set depending on a target air rate for realizing a demand torque, and a throttle opening correcting section for correcting the preset throttle opening on the basis of the target air rate upon fuel cutoff that stops a fuel from being supplied to the internal combustion engine and of an actual air rate measured by the air flow rate sensor.

Advantages of the Invention

According to the present invention, it is possible to provide an internal combustion engine control apparatus for detecting the adhesion and removal of deposits and quickly correcting a throttle opening.

MODES FOR CARRYING OUT THE INVENTION

Embodiments of the present invention will be described in detail below with reference to the drawings.

Embodiment 1

Figure 1:
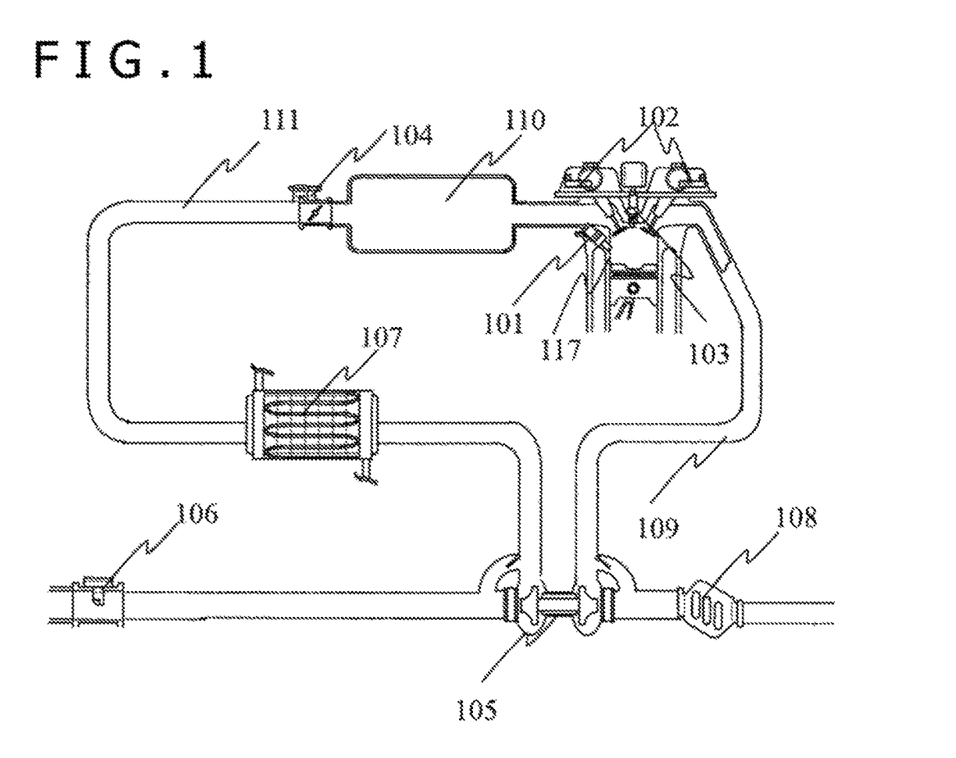
FIG. 1 is a view illustrating an example of an internal combustion engine to which the present invention is applied.

FIG. 1 illustrates an example of an internal combustion engine to which the present invention is applied. Although an internal combustion engine that includes a supercharger 105 will be described by way of example according to the present embodiment, the present invention is not limited to the illustrated example, but is equally applicable to other arrangements.

The internal combustion engine is controlled by a control apparatus, not shown, i.e., an engine control unit (ECU). The ECU controls air control devices, i.e., a throttle valve 104, variable intake and exhaust valves 102, the supercharger 105, and the like in order to realize a demand torque that is demanded by the driver or a drive assistance device. An air flow rate sensor 106 detects the flow rate of fresh air newly drawn in from outside. For throttle control, for example, a target air rate passing through the throttle valve 104 is calculated from the demand torque, and a target throttle opening for the throttle valve 104 is calculated from the target air rate according to a process to be described later. A pressure sensor, not shown, is disposed between the supercharger 105 and the variable intake and exhaust valves 102. For supercharger control, the supercharger 105 is FB-controlled, i.e., feedback-controlled, to equalize the pressure of air in an intake chamber 110 disposed downstream of an intake pipe 111 or the throttle valve 104 to a preset pressure determined depending on a driven state, using a detected value from the pressure sensor. Furthermore, in case the vehicle speed is high at the time the driver releases the accelerator pedal, a fuel cutoff control process is carried out to stop fuel injection from a fuel injection valve 101. Alternatively, an FB control process is carried out to cause an air-fuel ratio sensor, not shown, mounted on an exhaust pipe 109 to exhibit a present value in order to keep the purification efficiency of a catalytic converter 108. The ECU performs the above control processes using model base controls that incorporate a characteristic model of the devices and a dynamics model of physical quantities. An opening model of the throttle valve 104 according to the present embodiment is incorporated on the basis of the following equations (1) through (3) that represent orifice formulas:

$$\frac{dm_v}{dt} = \mu_v A_v P_{up} \sqrt{\frac{2}{R_{up} T_{up}}} \phi(P_{up}, P_{dn})$$ [Equation 1]

$$\phi(P_{up}, P_{dn}) = \left(\frac{2}{k+1}\right)^{1/(k-1)} \sqrt{\frac{k}{k+1}} \quad \ldots \quad \frac{P_{dn}}{P_{up}} < \left(\frac{2}{k+1}\right)^{k/(k-1)}$$ [Equation 2]

$$\phi(P_{up}, P_{dn}) = \sqrt{\frac{k}{k+1}\left\{\left(\frac{P_{dn}}{P_{up}}\right)^{2/k} - \left(\frac{P_{dn}}{P_{up}}\right)^{(k+1)/k}\right\}} \quad \ldots \quad \frac{P_{dn}}{P_{up}} \geq \left(\frac{2}{k+1}\right)^{k/(k-1)}$$ [Equation 3]

In the equations, $dm_v/dt$ and k represent a mass flow rate and a ratio of specific heat of air flowing through the throttle valve 104, $\mu_v A_v$ an effective opening area, $P_{up}$, $T_{up}$, $R_{up}$ a pressure, a temperature, and a gas constant, respectively, upstream of the throttle valve 104, and $P_{dn}$ a pressure downstream of the throttle valve 104.

Figure 2:
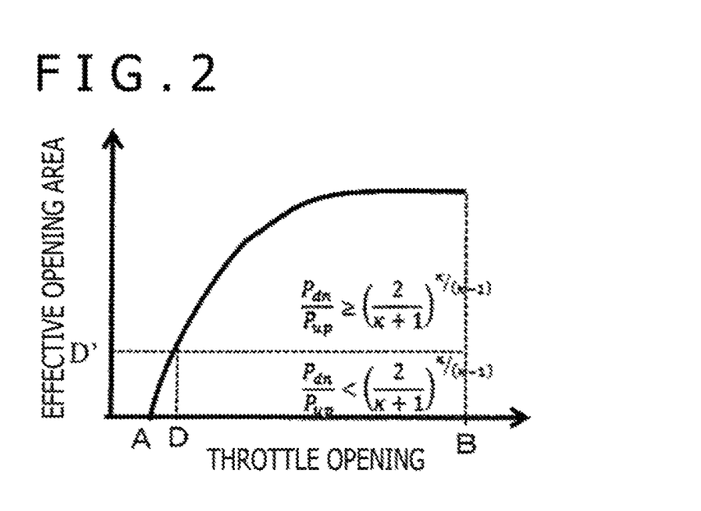
FIG. 2 is a diagram illustrating an example of a throttle opening model.

FIG. 2 illustrates an example of an opening model of the throttle valve 104. The opening model of the throttle valve 104 is experimentally determined according to the equations (1) through (3) that represent orifice formulas. Specifically, at a constant engine rotational speed, the opening of the throttle valve 104 is varied, and the mass flow rate $dm_v/dt$ of air, the pressure $P_{up}$ and the temperature upstream of the throttle valve 104, and the pressure $P_{dn}$ downstream of the throttle valve 104 are measured, with the gas constant $R_{up}$ and the ratio k of specific heat being of fresh air values of 274 and 1.4, respectively. The effective opening area $\mu_v A_v$ can be calculated from these measured values according to the equations (1) and (2) or the equation (3). In FIG. 2, the opening A represents the opening of the throttle valve 104 as it is fully closed, the opening B the opening of the throttle valve 104 as it is fully opened. A deviation of a throttle opening sensor is corrected by a throttle opening origin learning process to be described later. The throttle opening sensor is integrally combined with the throttle valve 104.

The opening D in FIG. 2 represents a sonic opening. In case the pressure upstream of the throttle valve 104 is the atmospheric pressure, i.e., 101 kPa, for example, the throttle opening where the pressure downstream of the throttle valve 104 is equal to or lower than 53 kPa represents the sonic opening according to the orifice formulas (1) and (2). In other words, the present embodiment focuses on the fact that providing the throttle valve 104 is closed to an opening less than the sonic opening, the flow rate of air flowing through the throttle valve 104 is of a constant value depending on the pressure upstream of the throttle valve 104 irrespectively of the engine rotational speed, according to the orifice formulas (1) and (2).

Figure 3:
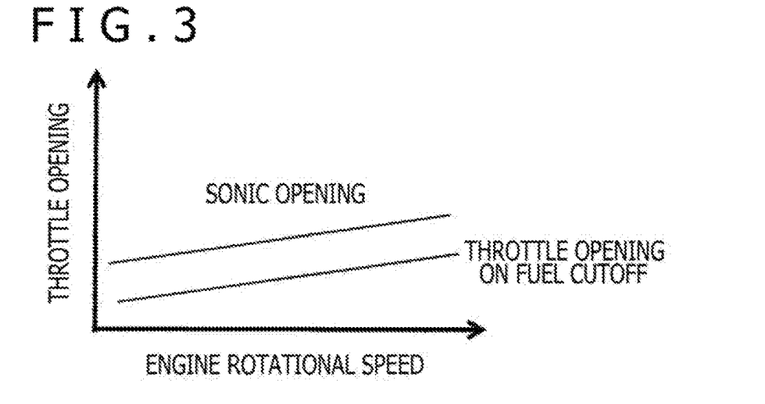
FIG. 3 is a diagram illustrating an example of the relationship between a throttle opening and a sonic opening on fuel cutoff.

FIG. 3 illustrates an example of the relationship between a throttle opening and a sonic opening on fuel cutoff. When the fuel is cutoff, the throttle opening is kept at a constant opening after the throttle valve has been moved in a more closing direction than when the engine is in steady operation. This control process serves two purposes of making engine braking work and keeping the amount of oxygen stored in the catalyst converter from increasing. At this time, the pressure downstream of the throttle valve 104 has a value of approximately 30 kPa. As illustrated in FIG. 3, the opening of the throttle valve 104 is smaller than the sonic opening when the fuel is cutoff. Therefore, even though the sonic opening is not strictly calculated, it is possible to determine whether or not the opening of the throttle valve 104 is equal to or smaller than the sonic opening on the basis of a fuel cutoff flag calculated by the ECU. The description that follows is based on the premise that the relationship illustrated in FIG. 3 is effective.

Figure 4:
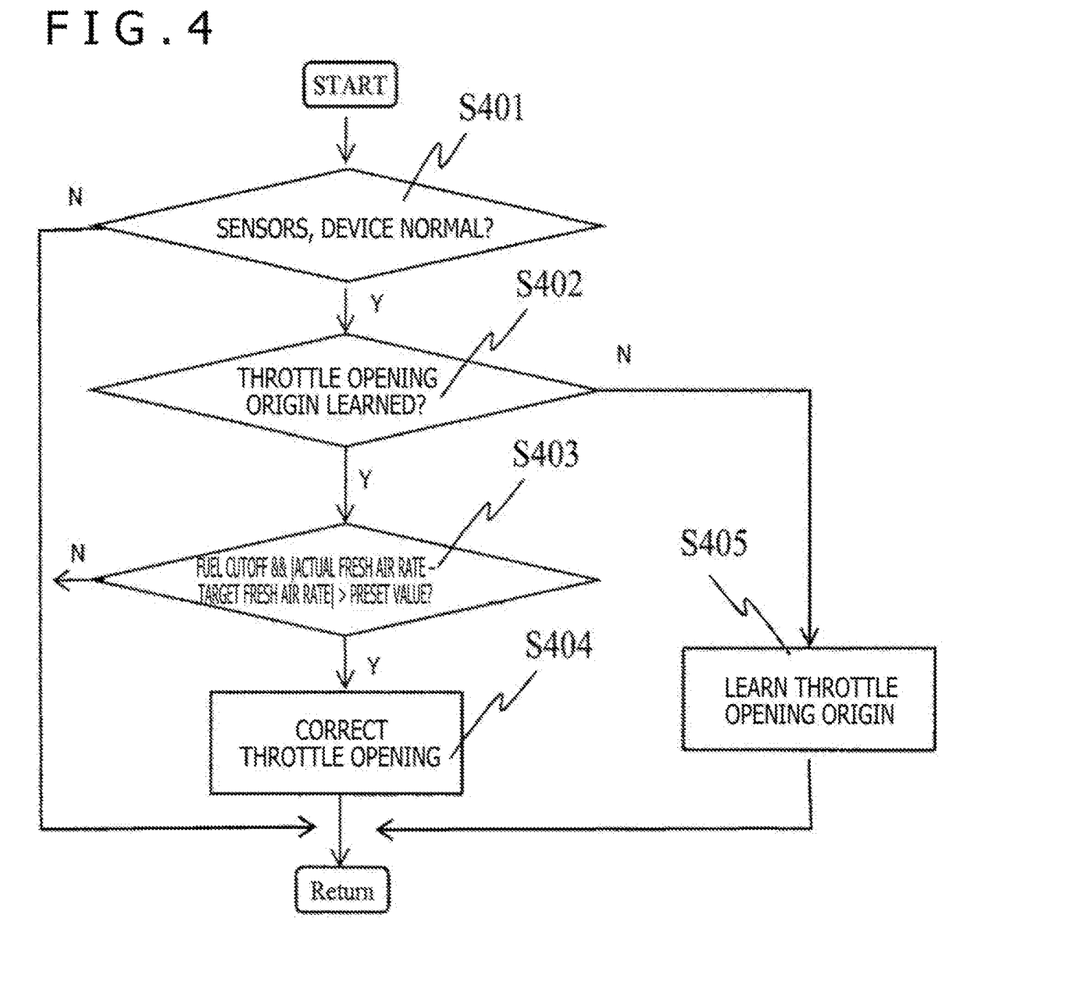
FIG. 4 is a diagram illustrating an example of a throttle opening correction flowchart according to the present invention.

FIG. 4 illustrates an example of a throttle opening correction flowchart according to the present embodiment. In step S401, it is confirmed whether the throttle valve 104 is operating normally, i.e., whether the throttle valve 104 is stuck or not. It is also confirmed whether the throttle opening sensor is operating normally, i.e., whether dual-system sensor outputs agree with each other or not. It is confirmed that the air flow rate sensor 106 is operating normally, i.e., it has not suffered a disconnection and a corrective quantity for an air-fuel ration FB does not exceed a preset value. If the sensors and the device are normal in step S401, then control goes to step S402. In step S402, it is confirmed whether the throttle opening origin learning process has finished or not. If the throttle opening origin learning process has finished, then control goes to step S403. If the throttle opening origin learning process has not finished, then control goes to step S405.

In step S405, the throttle opening origin learning process is carried out. According to the throttle opening origin learning process, the detected value obtained from the throttle opening sensor at the time a fully closing command is given to the throttle valve 104 is learned as A in FIG. 2. In this case, the detected value obtained from the throttle opening sensor at the time a fully opening command is given to the throttle valve 104 may be learned as B in FIG. 2. The timing of the throttle opening origin learning process should preferably be immediately after the engine is switched off. In case the learned value is lost immediately after the battery is replaced, the throttle opening origin learning process may be carried out at the time of a first idling stop. By performing the throttle opening origin learning process, it is possible to reduce a deviation from the throttle opening model based on the throttle opening sensor for thereby increasing the accuracy of throttle opening correction according to the present embodiment.

In step S403, it is determined whether the difference between an actual air rate and a target air rate upon fuel cutoff is larger than a preset value or not. If the difference is larger than the preset value, then control goes to step S404 to perform throttle opening correction. The preset value in step S403 is a value determined depending on the effect that an error of the throttle opening model has on an idling rotational speed variation and a transmission shock. For example, it is assumed that the effective opening area of 1 mm$^2$ is reduced by the adhesion of deposits. In case the flow rate of air during idling is approximately 200 g/min., since a fresh air flow rate of approximately 14.4 g/min. is reduced according to the orifice formulas (equation 1) and (equation 2), the engine output is lowered by at least approximately 7% (14.4/200). A situation in which a real engine suffers rough idling or a transmission shock due to the above reduction in the engine output is examined by way of experimentation. The above preset value may be established in a manner to prevent the engine from suffering rough idling or a transmission shock. Details of the processing of step S404 will be described below with reference to FIGS. 5 and 6.

Figure 5:
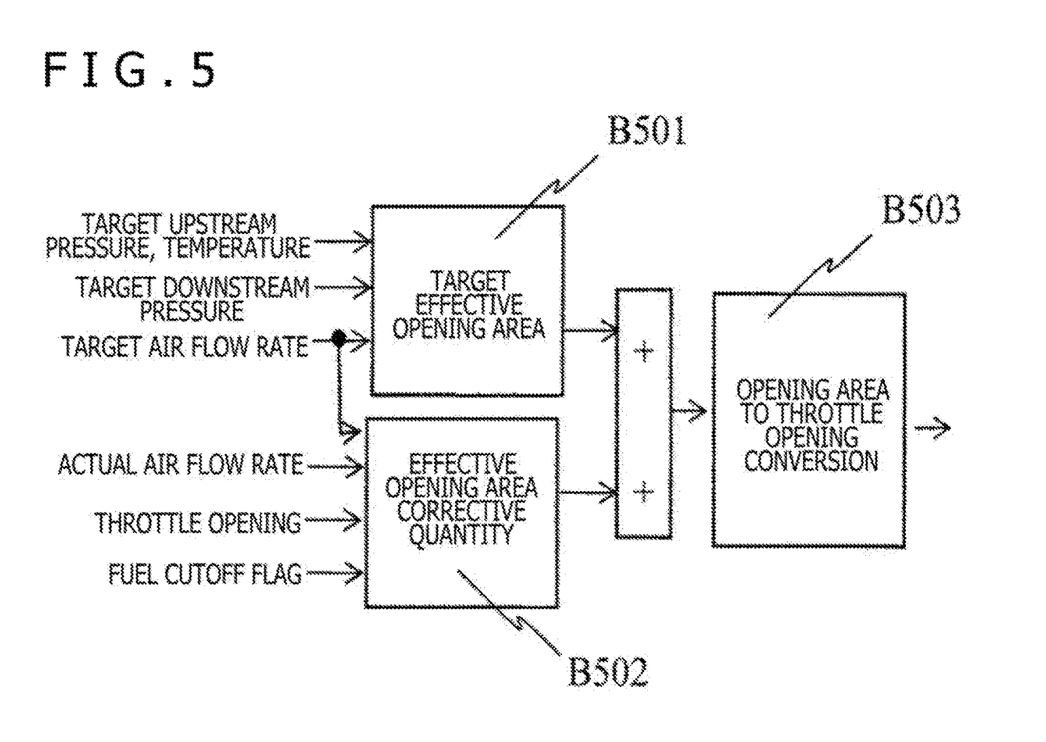
FIG. 5 is a diagram illustrating an example of throttle opening correction blocks.

FIG. 5 illustrates an example of throttle opening correction blocks according to the present embodiment. The throttle opening correction blocks generally include three blocks. A block B501 is a block for calculating a target effective opening area for the throttle valve 104 depending on a target air rate calculated from the demand torque. Here, the block B501 calculates the target effective opening area according to the orifice formulas (equation 1) through (equation 3). Specifically, a target air flow rate is substituted for dm$_v$/dt, a target upstream pressure for P$_{up}$, a target upstream temperature for T$_{up}$, and a target downstream-of-throttle pressure for P$_{dn}$, and the gas constant R$_{up}$ and the ratio k of specific heat are set respectively to 273 and 1.4. The target effective opening area is calculated from $\mu_v A_v$.

The values such as of the target upstream pressure may be set to values obtained from a bench test or the like, or may be calculated in a timely fashion using the above model. A block B502 is a block for calculating a corrective quantity for the effective opening area. Details of the block B502 will be described later. A block B503 calculates a throttle opening from the sum of the target effective area and the effective area corrective quantity, using backwards the relationship between the throttle opening and the effective opening area illustrated in FIG. 2. The throttle opening can thus be corrected by adding an effective opening area corrective quantity, to be described later, to the target effective opening area calculated according to the orifice formulas.

Figure 6:
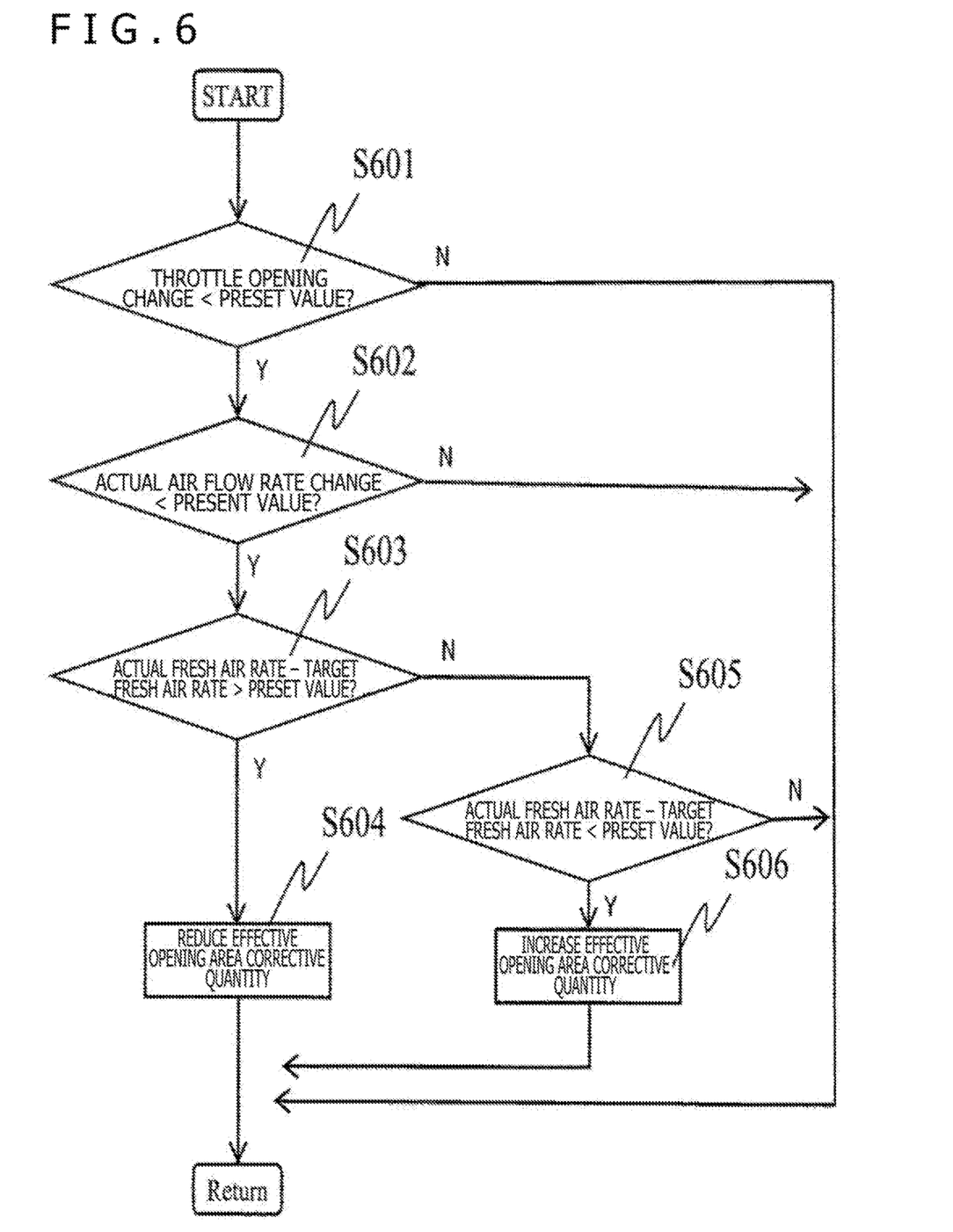
FIG. 6 is a diagram illustrating an example of an effective opening area correction flowchart according to the present invention.

FIG. 6 illustrates an example of an effective opening area correction flowchart according to the present embodiment. In step S601, it is determined whether or not a throttle opening change is equal to or smaller than a preset value. If the throttle opening change is smaller than the preset value, then control goes to step S602. In step S602, it is determined whether or not a change in the actual air rate detected by the air flow rate sensor 106 is equal to or smaller than a preset value. If the actual air rate change is smaller than the preset value, then control goes to step S603. If the difference between the actual air rate and the target air rate is larger than a preset value in step S603, then control goes to step S604. If not, then control goes to step S605.

In step S604, the effective opening area corrective quantity is reduced at a constant preset ratio to correct the throttle valve 104 in a closing direction. In this manner, the air flow rate is prevented from increasing that is due to the removal of deposits, thereby preventing a transmission shock and a sudden increase in the idling rotational speed from occurring upon the removal of deposits. If the difference between the actual air rate and the target air rate is smaller than a preset value (a negative value) in step S605, then control goes to step S606. In step S606, the effective opening area corrective quantity is increased at a constant preset ratio to correct the throttle valve 104 in an opening direction. In this manner, the air flow rate is prevented from decreasing that is due to the adhesion of deposits.

In step S604 and step S606, the opening area is corrected at the constant preset ratios. This is to prevent the air flow rate from changing abruptly that is due to the throttle correction, thereby prevent the riding comfort from being impaired owing to torque variations during the correction process.

Figure 7:
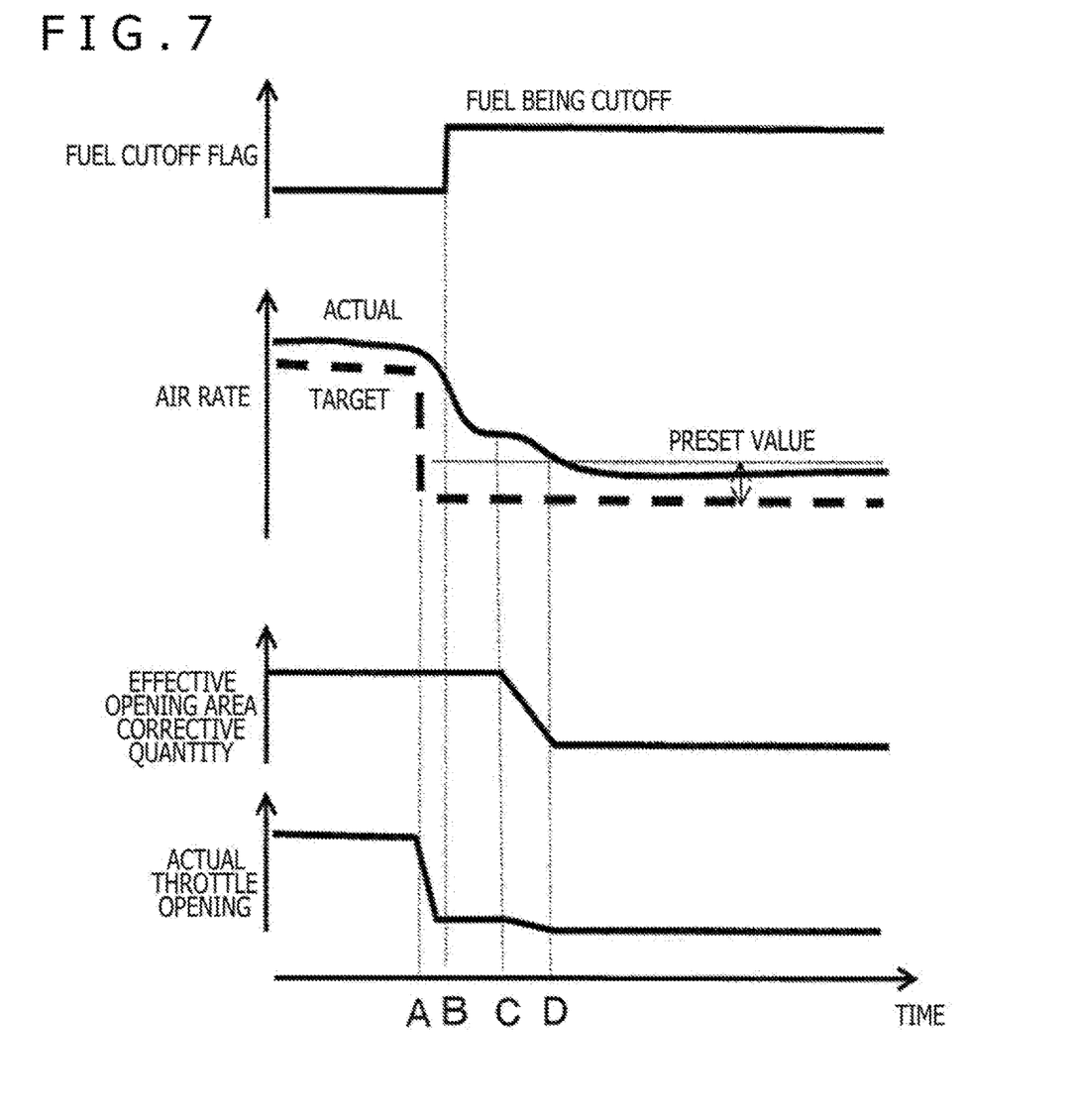
FIG. 7 is a diagram illustrating an example of timing charts at the time the present invention is applied upon the removal of deposits.

FIG. 7 illustrates an example of timing charts at the time the present embodiment is applied upon the removal of deposits. At time A, the target air rate is reduced as the demand torque, not shown, decreases, whereupon the throttle opening starts to be reduced. At time B, while the fuel cutoff, i.e., the stopping of fuel injection, is underway, since the actual air rate change is larger than the preset value, the effective opening area correction is not performed, keeping the throttle opening constant. There are various factors in terms of exhaust and riding comfort for causing the delay from time A to time B, and they will not be described below as their control is complex. At time C, the change in the actual air rate is smaller than the preset value, and the difference between the actual air rate and the target air rate is larger than the preset value. Consequently, a control process is performed to reduce the effective opening area correction quantity at a constant preset ratio, correcting the actual throttle opening in a closing direction. Finally, at time D, the difference between the actual air rate and the target air rate is smaller than the preset value, making the effective opening area correction quantity constant and also making the actual throttle opening constant. According to the present embodiment, therefore, throttle correction is carried out upon the fuel cutoff, and the throttle opening is corrected in a closing direction upon the removal of deposits.

Figure 8:
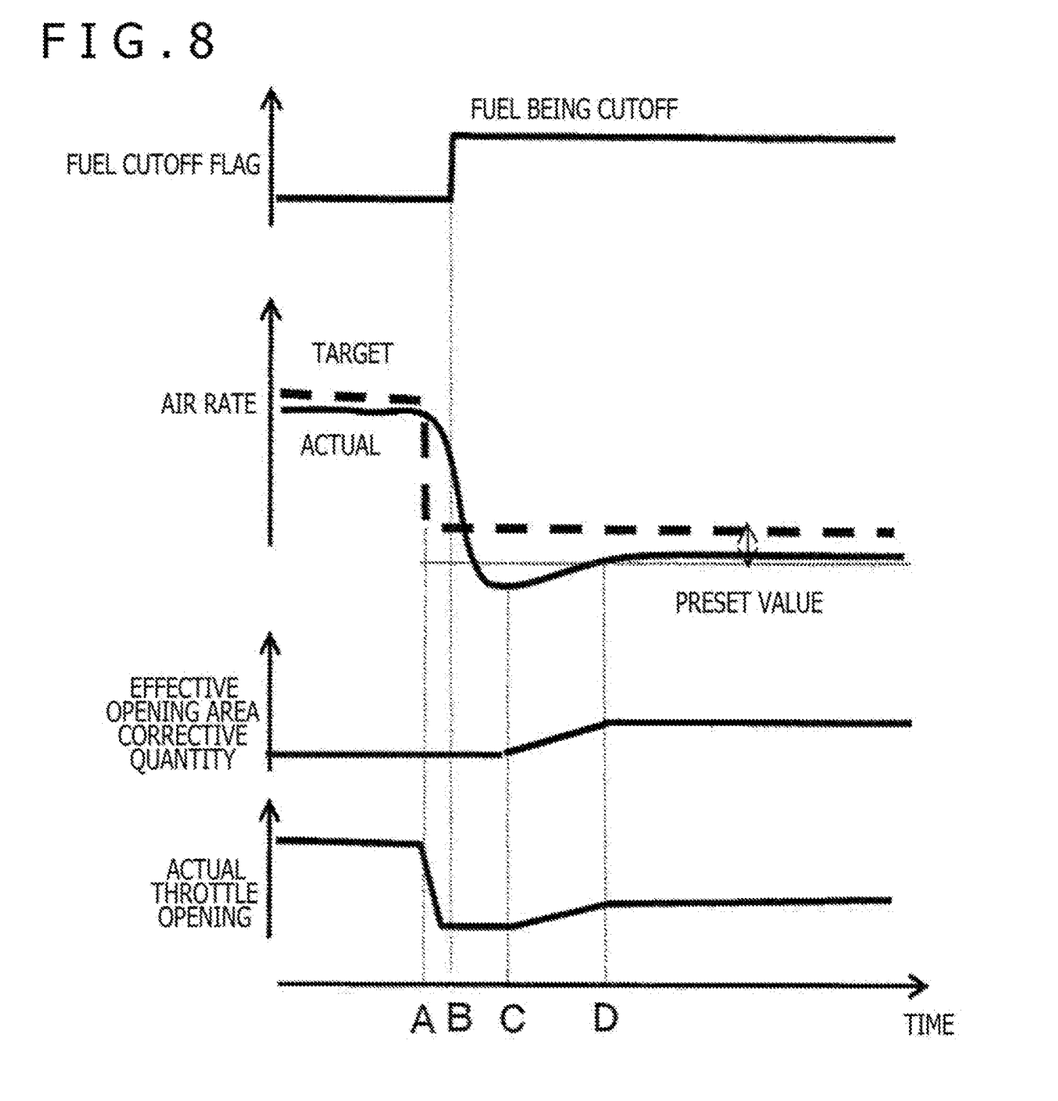
FIG. 8 is a diagram illustrating an example of timing charts at the time the present invention is applied upon the adhesion of deposits.

FIG. 8 illustrates an example of timing charts at the time the present embodiment is applied upon the adhesion of deposits. At time A, the target air rate is reduced as the target torque decreases, whereupon the throttle opening is closed. At time B, while the fuel cutoff is being performed, since the actual air rate change is larger than the preset value, the effective opening area correction is not carried out, keeping the throttle opening constant. At time C, the change in the actual air rate is smaller than the preset value, and the difference between the actual air rate and the target air rate becomes negative and is smaller than the preset value. Consequently, the effective opening area correction quantity is increased at a constant preset ratio, correcting the actual throttle opening in an opening direction. Finally, at time D, the difference between the actual air rate and the target air rate is larger than the preset value, making the effective opening area correction quantity constant and also making the actual throttle opening constant.

As described above, the internal combustion engine control apparatus (ECU) according to the present embodiment controls the internal combustion engine that includes the air flow rate sensor 106 for measuring the rate of air, i.e., the actual rate of air, flowing into a cylinder 117, and the throttle valve 104 for adjusting the air rate. The ECU includes a throttle valve controlling section for controlling the throttle opening of the throttle valve 104 to reach a preset throttle opening set depending on a target air rate for realizing a demand torque, and a throttle opening correcting section for correcting the preset throttle opening on the basis of the target air rate upon the fuel cutoff that stops the fuel from being supplied to the internal combustion engine and of the actual air rate measured by the air flow rate sensor 106.

Specifically, the throttle opening correcting section corrects the preset throttle opening in case the difference between the target air rate during the fuel cutoff and the actual air rate measured by the air flow rate sensor 106 becomes equal to or larger than a preset value. More specifically, the throttle opening correcting section corrects the preset throttle opening by correcting the relationship between the preset throttle opening and the opening area on the basis of the target air rate during the fuel cutoff and the actual air rate measured by the air flow rate sensor 106.

According to the present embodiment thus applied, throttle correction is carried out during the fuel cutoff, and the throttle opening is corrected in a closing direction upon the adhesion of deposits. Since a change in the effective opening area is generally larger due to the removal of deposits than due to the adhesion of deposits, the rate of change in the effective opening area corrective quantity during the time interval from time C to time D as illustrated in FIGS. 7 and 8 may be set such that it is larger upon the removal of deposits than upon the adhesion of deposits.

By thus applying the present embodiment, a change in the opening area due to the accumulation and removal of deposits while the vehicle is traveling can be detected, making it possible to correct the throttle opening prior to starting gear changes or idling operations. As a result, it is possible to prevent transmission shocks and engine racing during idling operations immediately after the removal of deposits. Furthermore, even in case the corrective quantity is cleared by the replacement of the battery or the like, since the throttle opening is quickly corrected upon the fuel cutoff while the vehicle is traveling, the engine is prevented from suffering rough idling on account of a flow rate reduction upon the adhesion of deposits.

Embodiment 2

The present invention as it is applied to a LP-EGR (Low Pressure-Exhaust Gas Recirculation) system will be described below with reference to FIGS. 9 through 13.

Figure 9:
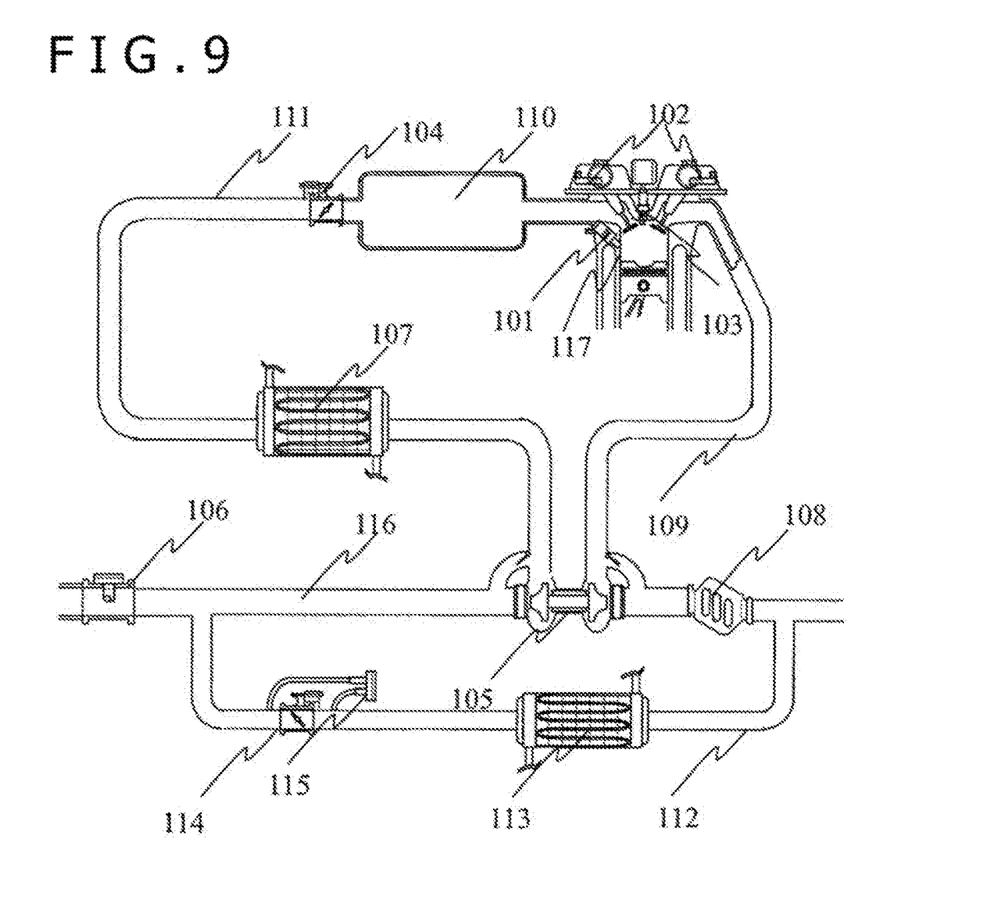
FIG. 9 is a view illustrating another example of an internal combustion engine to which the present invention is applied.

FIG. 9 illustrates another example of an internal combustion engine to which the present embodiment is applied. The internal combustion engine according to the present embodiment will be described below mainly with respect to the differences thereof from the internal combustion engine illustrated in FIG. 1. In the engine according to the present embodiment, exhaust gases are recirculated from a position downstream of the catalytic converter 108 via an EGR cooler 113 to a position upstream of the supercharger 105. The exhaust gas recirculation improves the fuel cost in a supercharged area. The ECU (engine control unit), not shown, controls the EGR flow rate precisely by controlling an EGR value 114 of the LP-EGR system on the basis of a measured value from a differential pressure sensor 115. In the present system, since the EGR gases flow through the throttle valve 104, deposits are more likely to be adhered and removed than with the internal combustion engine illustrated in FIG. 1. Furthermore, as the EGR gases that flow through the throttle valve 104 cannot be detected by the air flow rate sensor 106, some measures are required to detect the EGR gases flowing through the throttle valve 104.

Figure 10:
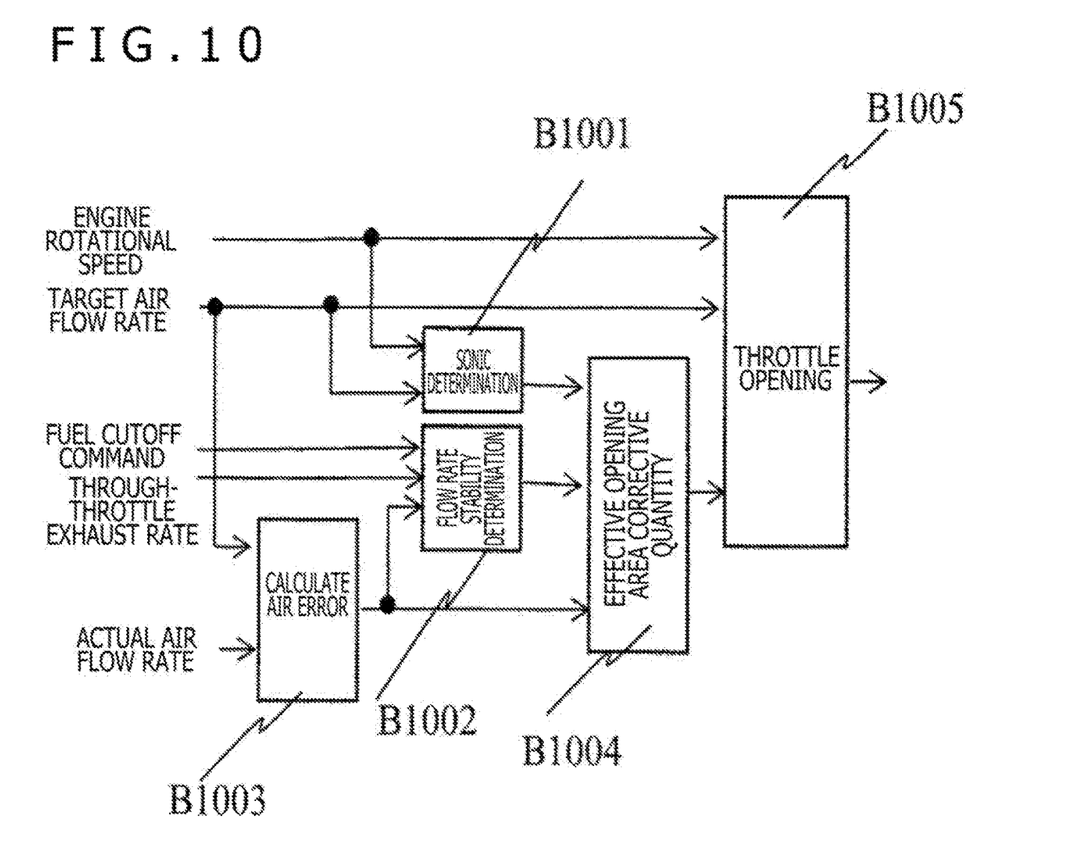
FIG. 10 is a diagram illustrating another example of throttle opening correction blocks.

FIG. 10 illustrates an example of throttle opening correction blocks according to the present embodiment. A block B1001 calculates a target upstream-of-throttle pressure and a target downstream-of-throttle pressure from the engine rotational speed and the target air rate, and determines that the air flow through the throttle valve 104 is in a sonic state if the ratio of the calculated pressures is smaller than $(2/(k+1))^{k/(k-1)}$. In other words, the block B1001 determines that the speed of the air flowing through the throttle valve 104 is the same as the speed of sound. A block B1003 calculates the difference between the target air rate and the actual air rate as an air error. For calculating the air error, a low-pass filter may be included in order to avoid the effect of noise of the air flow rate sensor. In addition, it is preferable to calculate the upstream-of-throttle pressure from an atmospheric pressure sensor, not shown, and an atmospheric temperature sensor, not shown.

A block B1002 calculates a variation in the air error in a fuel cutoff command, and determines that the flow rate is stable if the variation is smaller than a preset value and the rate of exhaust gases flowing through the throttle valve 104 is zero. The block B1002 may determine whether the rate of exhaust gases flowing through the throttle valve 104 is zero or not on the basis of the EGR flow rate detected by the differential pressure sensor 115 and a period of time that elapses after the EGR valve 114 is closed. A block B1004 calculates an effective opening area corrective quantity on the basis of the air error at the time the sonic state and the flow rate are determined. If the effective opening area corrective quantity is varied, then a block B1005 corrects the throttle opening.

Figure 11:
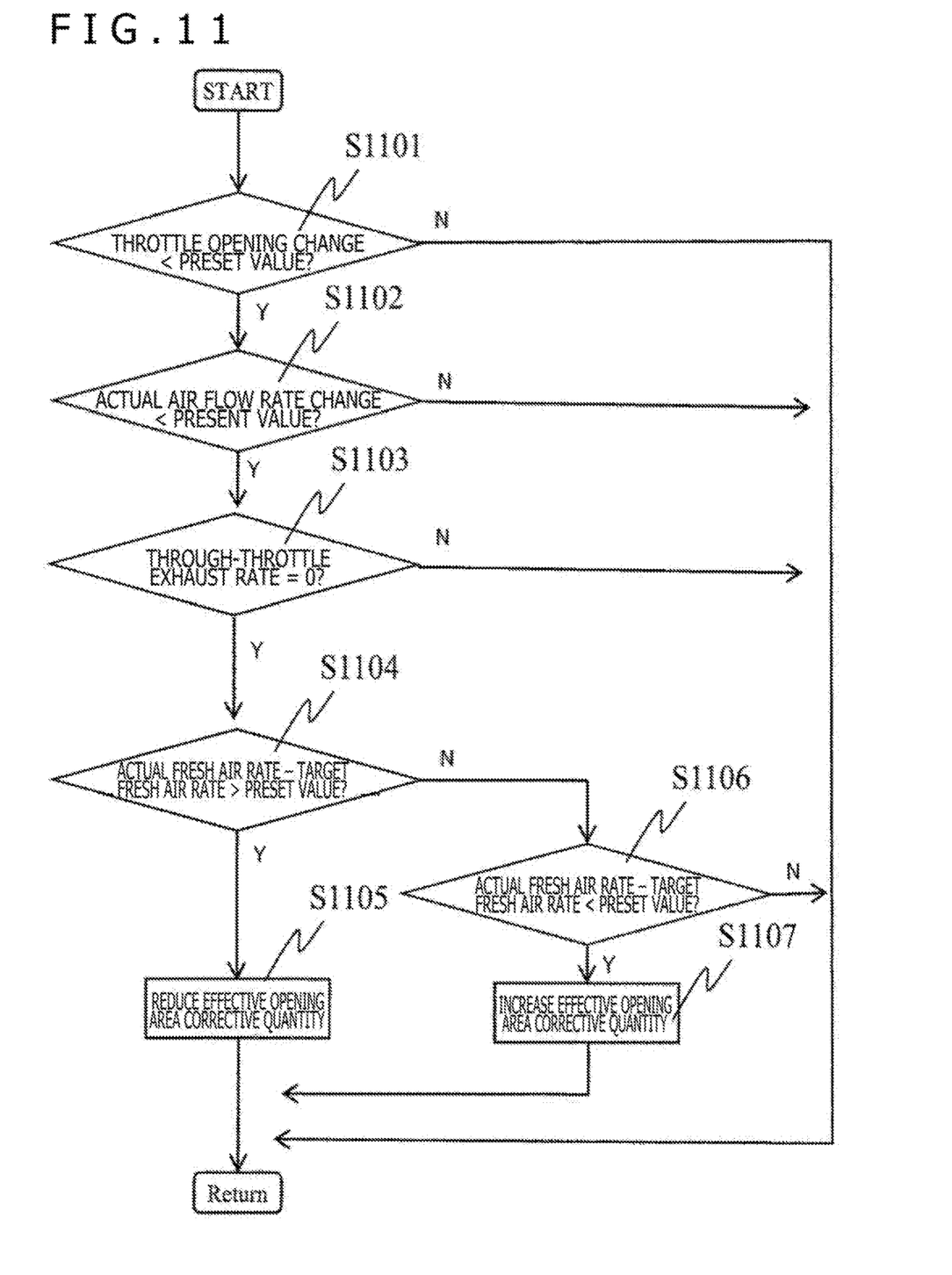
FIG. 11 is a diagram illustrating another example of an effective opening area correction flowchart according to the present invention.

FIG. 11 illustrates an example of an effective opening area correction flowchart according to the present embodiment. In step S1101, it is determined whether or not a throttle opening change is equal to or smaller than a preset value. If the throttle opening change is smaller than the preset value, then control goes to step S1102. In step S1102, it is determined whether or not a change in the actual air rate detected by the air flow rate sensor 106 is equal to or smaller than a preset value. If the actual air rate change is smaller than the preset value, then control goes to step S1103. In step S1103, it is determined whether the rate of exhaust gases flowing through the throttle valve 104 as determined by the process described with reference to FIG. 10, for example, is zero or not. If the rate of exhaust gases flowing through the throttle valve 104 is zero, then control goes to step S1104. If the rate of exhaust gases flowing through the throttle valve 104 should be calculated in greater detail, then it may be calculated from a physical model ranging from the EGR valve 114 to the throttle valve 104. With such an arrangement, since the rate of air flowing through the throttle valve 104 is in agreement with the rate of air detected by the air flow rate sensor 106, the actual air rate throttle opening is prevented from being corrected in error.

If the difference between the actual air rate and the target air rate is larger than a preset value in step S1104, then control goes to step S1105. If not, then control goes to step S1106. In step S1105, the effective opening area corrective quantity is reduced at a constant preset ratio to correct the throttle valve 104 in a closing direction. In this manner, a transmission shock and a sudden increase in the idling rotational speed are prevented from occurring upon the removal of deposits. If the difference between the actual air rate and the target air rate is smaller than a preset value (a negative value) in step S1106, then control goes to step S1107. In step S1107, the effective opening area corrective quantity is increased at a constant preset ratio to correct the throttle valve 104 in an opening direction. In this manner, the engine is prevented from suffering rough idling upon the adhesion of deposits, especially after the battery is replaced.

Figure 12:
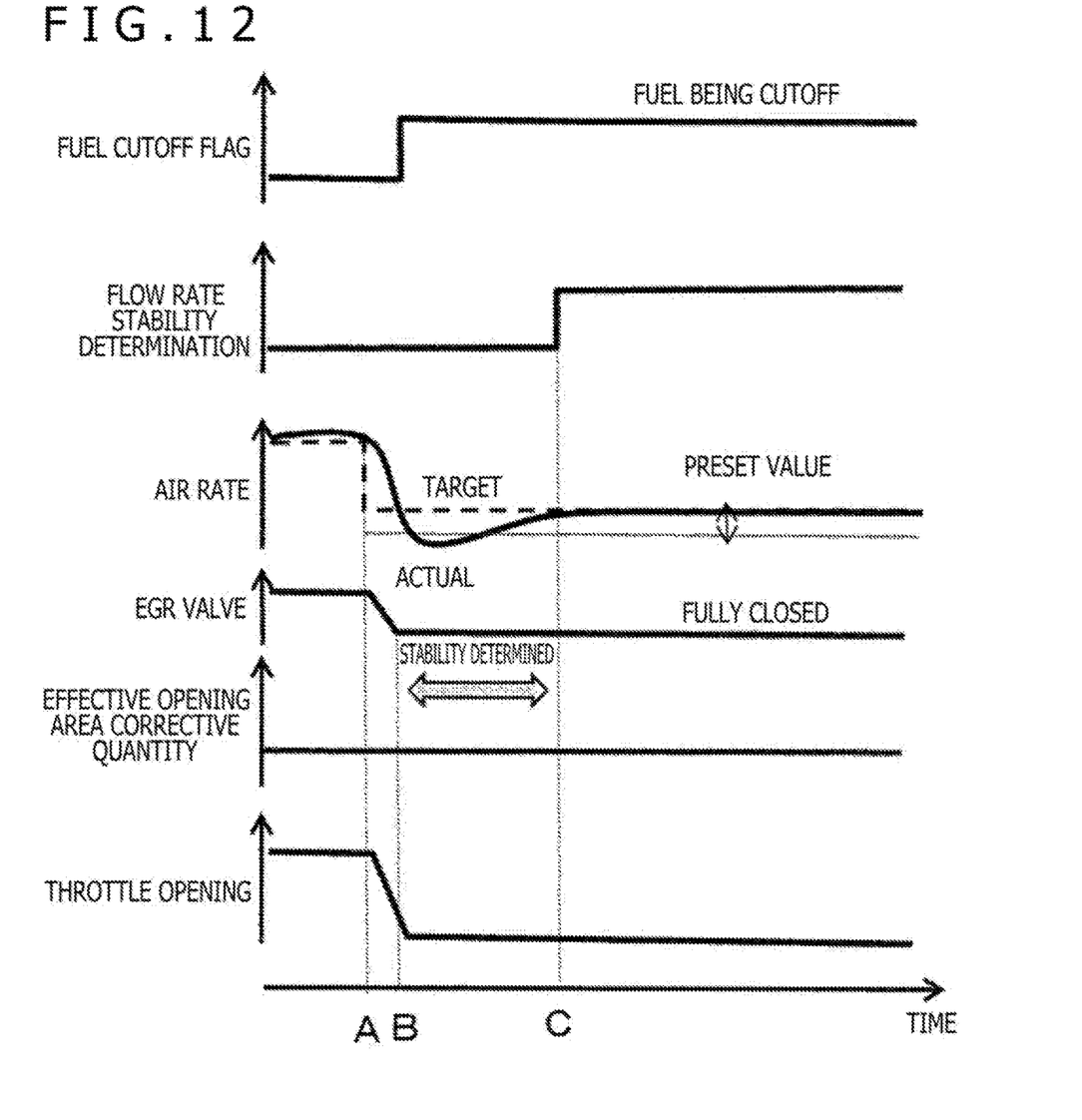
FIG. 12 is a diagram illustrating an example of timing charts at the time the present invention is applied.

FIG. 12 illustrates an example of timing charts at the time the present embodiment is applied. At time A, the target air rate is reduced as the target torque decreases, whereupon the EGR valve and the throttle opening starts to be reduced. Time B is a time at which the EGR valve is fully closed. Until time C when the exhaust gases flowing through the throttle valve 104 become zero, no effective opening area correction is performed even if the difference between the actual air rate and the target air rate is of a negative value and exceeds a preset value. By thus taking into account the flow rate of exhaust gases flowing through the throttle valve 104, erroneous correction due to a reduction in the air flow rate is prevented at the time the exhaust gases are flowing at the EGR flow rate through the throttle valve 104.

Figure 13:
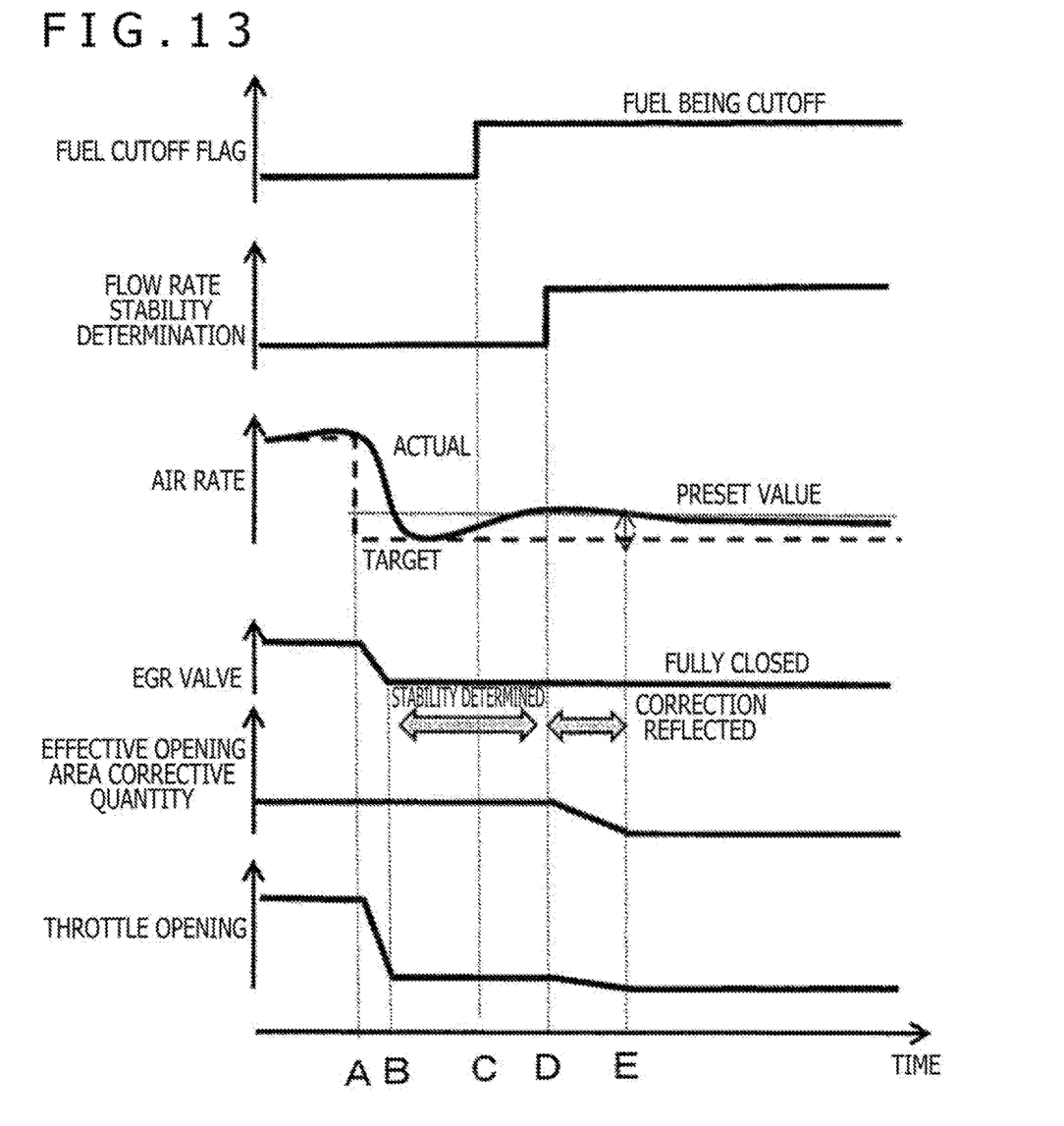
FIG. 13 is a diagram illustrating another example of timing charts at the time the present invention is applied upon the adhesion of deposits.

FIG. 13 illustrates an example of timing charts at the time the present embodiment is applied upon the adhesion of deposits. At time A, the target air rate is reduced as the demand torque decreases, whereupon the EGR valve and the throttle opening are closed. Time B is a time at which the EGR valve is fully closed. Until time C when the exhaust gases flowing through the throttle valve 104 become zero, no effective opening area correction is performed even if the difference between the actual air rate and the target air rate is of a negative value and exceeds a preset value. At time D, as the difference between the actual air rate and the target air rate is larger than the preset value, the effective opening area corrective quantity is reduced, and the throttle opening is corrected in a closing direction.

According to the present embodiment, as described above, a throttle opening correcting section of the ECU corrects the preset throttle opening in case the throttle opening of the throttle valve 104 becomes smaller than the sonic opening at which the speed of air flowing through the throttle valve 104 becomes the speed of sound. In other words, the sonic opening at which the speed of air flowing through the throttle valve 104 becomes the speed of sound is preset, and the throttle opening correcting section corrects the preset throttle opening in case the throttle opening of the throttle valve 104 becomes smaller than the sonic opening.

Moreover, the ECU according to the present embodiment includes a sonic determining section for determining the sonic opening at which the speed of air flowing through the throttle valve 104 becomes the speed of sound, on the basis of the ratio of pressures before and after the throttle valve 104. The throttle opening correcting section corrects the preset throttle opening in case the sonic determining section determines that the sonic state is established. Furthermore, the throttle opening correcting section performs the above correction in a direction to close the throttle in case the actual air rate measured by the air flow rate sensor 106, rather than the target air rate during the fuel cutoff, is larger than the preset value.

In addition, in case the exhaust gases of the internal combustion engine are returned to a position upstream of the throttle valve 104 even if the difference between the target air rate during the fuel cutoff and the actual air rate measured by the air flow rate sensor 106 is equal to or larger than the preset value, the throttle opening correcting section does not correct the preset throttle opening until the exhaust gases flowing through the throttle valve 104 are eliminated. Moreover, in case the exhaust gases of the internal combustion engine are returned to a position upstream of the throttle valve 104, the throttle opening correcting section corrects the preset throttle opening after the exhaust gases flowing through the throttle valve 104 are eliminated.

Moreover, the throttle opening correcting section corrects the preset throttle opening on the basis of the target air rate during the fuel cutoff and the actual air rate measured by the air flow rate sensor while the vehicle is traveling at vehicle speeds equal to or higher than a preset vehicle speed. Therefore, the throttle correction can be performed highly accurately by not correcting the throttle opening until the exhaust gases flowing through the throttle valve are eliminated.

DESCRIPTION OF REFERENCE CHARACTERS

101: Fuel injection valve
102: Variable valve
103: Engine
104: Ignition plug
105: Supercharger
106: Air flow rate sensor
107: Intercooler
108: Catalytic converter
109: Exhaust pipe
110: Intake chamber
111: Intake pipe
112: EGR pipe
113: EGR cooler
114: LP-EGR control valve
115: Differential pressure sensor
116: Intake pipe upstream of the supercharger

The invention claimed is:
1. An internal combustion engine control apparatus for controlling an internal combustion engine that has an air flow rate sensor for measuring a rate of air represented as an actual air rate, the air flowing into a cylinder, and a throttle valve for adjusting the rate of air, the internal combustion engine control apparatus comprising:
 a throttle valve controlling section for controlling a throttle opening of the throttle valve to reach a preset throttle opening set depending on a target air rate for realizing a demand torque; and
 a throttle opening correcting section for correcting the preset throttle opening on a basis of the target air rate upon fuel cutoff that stops a fuel from being supplied to the internal combustion engine and of an actual air rate measured by the air flow rate sensor, wherein the throttle opening correcting section corrects the preset throttle opening when a difference between the target air rate during the fuel cutoff and the actual air rate measured by the air flow rate sensor is equal to or larger than a preset value.

2. The internal combustion engine control apparatus according to claim 1, wherein
the throttle opening correcting section corrects the preset throttle opening by correcting a relationship between the present throttle opening and an opening area on a basis of the target air rate during the fuel cutoff and the actual air rate measured by the air flow rate sensor.

3. The internal combustion engine control apparatus according to claim 1, wherein
the throttle opening correcting section corrects the preset throttle opening in case a throttle opening of the throttle valve is smaller than a sonic opening where a speed of air flowing through the throttle valve becomes a speed of sound.

4. The internal combustion engine control apparatus according to claim 1, wherein
a sonic opening where a speed of air flowing through the throttle valve is a speed of sound is preset; and
the throttle opening correcting section corrects the preset throttle opening in case a throttle opening of the throttle valve is smaller than the sonic opening.

5. The internal combustion engine control apparatus according to claim 1, further comprising:
a sonic determining section for determining a sonic opening where a speed of air flowing through the throttle valve is a speed of sound is preset on a basis of a ratio of pressures before and after the throttle valve, wherein
the throttle opening correcting section corrects the preset throttle opening in case the sonic determining section determines that a sonic state is established.

6. The internal combustion engine control apparatus according to claim 1, wherein
the throttle opening correcting section corrects the preset throttle opening in a direction to close the throttle valve in case an actual air rate measured by the air flow rate sensor, rather than the target air rate during the fuel cutoff, is larger than a preset value.

7. The internal combustion engine control apparatus according to claim 1, wherein
in case exhaust gases of the internal combustion engine are returned to a position upstream of the throttle valve even if a difference between the target air rate during the fuel cutoff and an actual air rate measured by the air flow rate sensor is equal to or larger than a preset value, the throttle opening correcting section does not correct the preset throttle opening until the exhaust gases flowing through the throttle valve are eliminated.

8. The internal combustion engine control apparatus according to claim 7, wherein
in case the exhaust gases of the internal combustion engine are returned to the position upstream of the throttle valve, the throttle opening correcting section corrects the preset throttle opening after the exhaust gases flowing through the throttle valve are eliminated.

9. The internal combustion engine control apparatus according to claim 1, wherein
the throttle opening correcting section corrects the preset throttle opening on a basis of the target air rate during the fuel cutoff and an actual air rate measured by the air flow rate sensor when a vehicle incorporating the internal combustion engine is traveling at vehicle speeds equal to or higher than a preset vehicle speed.

* * * * *